No. 624,230. Patented May 2, 1899.
A. J. MARQUAND.
SECONDARY BATTERY PLATE AND METHOD OF PRODUCING SAME.
(Application filed Dec. 27, 1897.)
(No Model.) 2 Sheets—Sheet 1.

No. 624,230. Patented May 2, 1899.
A. J. MARQUAND.
SECONDARY BATTERY PLATE AND METHOD OF PRODUCING SAME.
(Application filed Dec. 27, 1897.)
(No Model.) 2 Sheets—Sheet 2.

UNITED STATES PATENT OFFICE.

AUGUSTUS JOHN MARQUAND, OF CARDIFF, ENGLAND.

SECONDARY-BATTERY PLATE AND METHOD OF PRODUCING SAME.

SPECIFICATION forming part of Letters Patent No. 624,230, dated May 2, 1899.

Application filed December 27, 1897. Serial No. 663,629. (No model.)

*To all whom it may concern:*

Be it known that I, AUGUSTUS JOHN MARQUAND, residing at Cardiff, in the county of Glamorgan, England, have invented Improvements in Secondary-Battery Plates and Methods of Producing the Same, of which the following is a specification.

This invention relates to improved secondary or storage batteries, and has for its object the production of plates for such batteries by a process giving great mechanical strength, large storage capacity, and low cost, with small wear and tear in use and the employment of a special electrolyte in secondary batteries.

Figure 1:
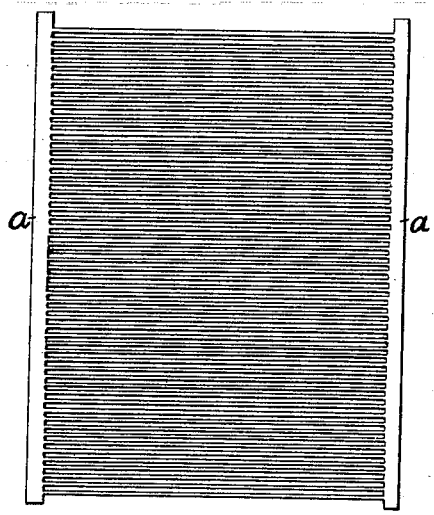
Figure 2:
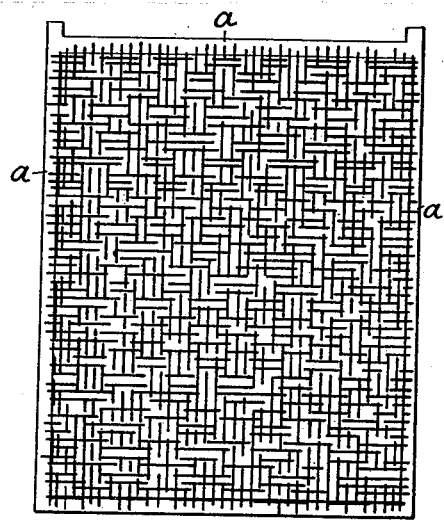
Figure 3:
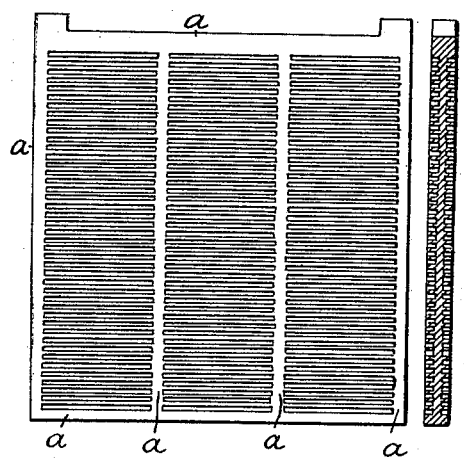
Figure 4:
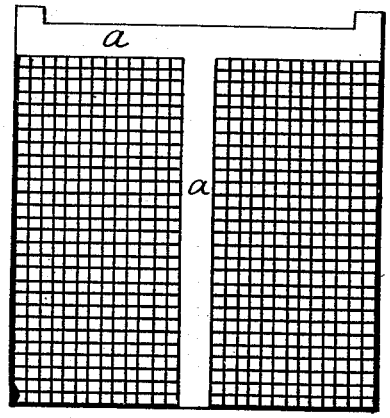
Figure 5:
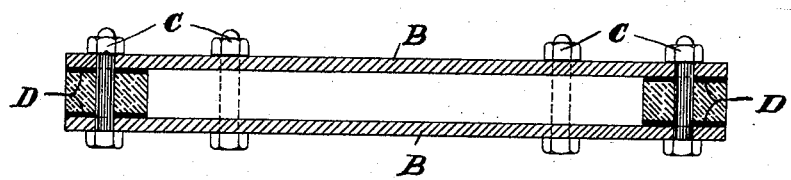
Figure 6:
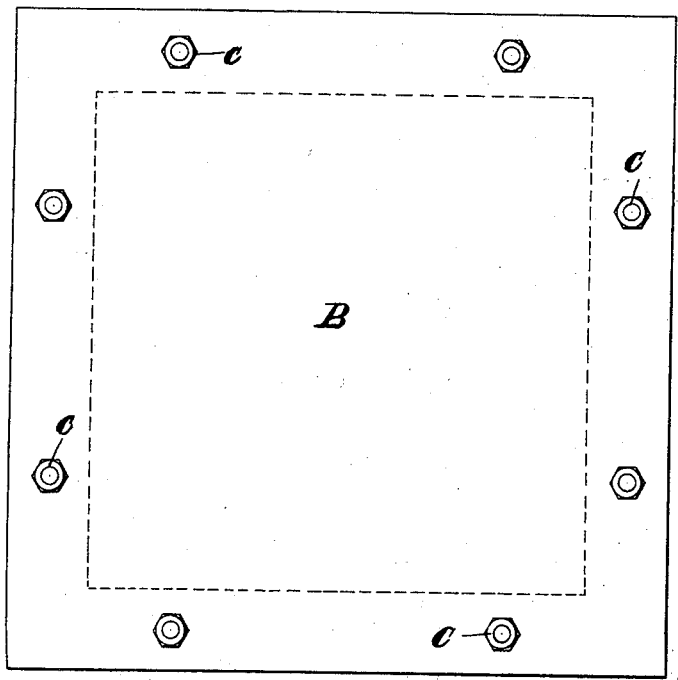

Figure 1 shows a plate composed of parallel bars united at the two ends into solid conducting-bars. Fig. 2 shows a plate composed of a woven network or mat of lead wires cast or burned onto solid conducting-bars. Fig. 3 shows a grid perforated part way through on each side, with a solid web of metallic lead and with conducting-bars on the top and across the center. Fig. 4 shows a perforated plate or grid with a solid top and center rib. Figs. 5 and 6 show a longitudinal section and plan, respectively, of the air-tight box in which the plate is placed for heating in a furnace.

To carry out my invention I prepare lead plates for use in secondary batteries by their partial conversion by the aid of heat into lead sulfid, the sulfid being then reduced by electrolytic means to the metallic state, which plates are suitable for negative plates, and the said reduced plates, being peroxidized by electrolytic means, are suitable as positive plates.

In order to prepare the foundation-plates according to my invention so that while having a large amount of porous or active material there should be a continuous backing or network of metallic lead together with sufficiently strong metallic-lead connections for conducting the current from the plates, I proceed as follows: I prepare a plate of lead or lead alloyed with antimony, which may be in the form of a grid in which holes pass right through or only part way through from either side and which may be produced by casting or stamping, this plate having solid bars or ribs at the top and in certain cases down the side or center for the purpose of strengthening the plate and assisting the distribution of the current. Those bars or ribs $a$ which are intended in subsequent processes (now to be described) to be unacted on—that is, left in the solid metallic state—are covered with a protecting layer of material which will be unacted on either by heat or by sulfur melted or in vapor. There are many methods of effecting this—such as by covering these parts of the plates with strips of iron or other metal not acted on by sulfur at the temperature of melting lead, or asbestos strips, or certain heat-resisting varnishes, or japan may be used; but the method which I prefer is to coat them with a coating of a fusible enamel, and in order that this may be done with an enamel infusible at the melting-point of lead I coat the parts to be protected with the said enamel in a state of powder mixed with a suitable medium and then heat the same in a flame of high temperature, such as a blowpipe or oxyhydrogen flame, with a result that the enamel is fused without melting the metallic lead underneath. Various enamels may be used; but I find the following composition to be a suitable enamel for the purpose: calcium fluorid, 4.9 per cent.; feldspar, 45.6 per cent.; sodium silicate, 25.3 per cent.; silicon dioxid, 4.9 per cent.; barium sulfate, 19.3 per cent. The plate so protected is now placed in a box, Figs. 5 and 6, which may be of cast or wrought iron, having a lid B, which may be secured air-tight, or nearly so, by bolts C on asbestos packing-rings D. The plate is placed in this box and is covered with sulfur, the amount depending on the required electrical capacity of the plate. I find the following proportions to hold good: for each ampere-hour of required capacity I place about two grams of sulfur on the plate.

The box containing the plate, laid parallel to the bottom of the box, is placed in a furnace as nearly level as possible, but if out of level at all it should be slightly inclined toward the solid bar at the top of the plate and the box is heated to the melting-point of lead. By this means portions of the lead of the plate to a degree depending on the amount of sulfur placed on the plate are converted into sulfid of lead, there being, however, throughout the plate a continuous network or conducting-backing of metallic lead unacted on by the sulfur, while the protected parts of the plate are also unacted on by the sulfur. The plate so prepared after being allowed to cool is removed from the box and forms the cathode of an electrolytic cell containing dilute sulfuric acid. By this means the sulfid of lead is reduced to the state of metallic lead and in a highly porous form, offering a very large surface, but at the same time mechanically and electrically continuous with the lead backing and conducting-bars. This plate while in the soft or spongy state may be compressed in a mold. A plate so prepared is ready for use as a positive plate of a secondary battery. By reversing the direction of the current through the electrolytic cell the plate may be peroxidized and form the negative plate of a battery.

In certain cases the following modified method of preparing the plate may be adopted: Lead sulfid or a mixture of fine metallic lead and sulfur or lead oxids and sulfur may be made into a paste and pasted or packed into the openings or interstices of a plate, as previously described, and the plate thus pasted being submitted to the action of heat the lead sulfid is partially reduced to a subsulfid at the surface of connection between the paste and the plate becomes mechanically and electrically continuous with it and may be reduced in manner already described. Plates so prepared may be used in the ordinary manner in an electrolyte composed of dilute sulfuric acid.

The plates produced according to my invention may be used flat, or after they have been sulfided and reduced to the metallic state may be folded or bent to any required form, circular or otherwise, before being peroxidized, and the plates may be used inclosed in envelops or supporting-frames, in manner well understood by those versed in the art.

Having now described this invention, I declare that what I claim, and desire to secure by Letters Patent, is—

1. The improved method of producing plates for secondary or storage batteries, consisting of the protection of certain parts of lead plates or foundations, against the action of sulfur, the treatment of such partly-protected lead plates or foundations, in a closed box with sulfur at or near the melting-point of lead, and the subsequent reduction or peroxidation by electrolytic means of the prepared surfaces, substantially as described.

2. The improved method of producing plates for secondary or storage batteries by packing the interstices of lead plates or foundations protected as to such part of their surface as are not intended to be acted upon, with porous or spongy materials adapted to produce subsulfid of lead under heat in a closed box, such as lead sulfid heating the said plate in a closed box at or near the melting-point of lead and the subsequent reduction or peroxidation by electrolytic means substantially as described.

3. In a plate for secondary batteries, an external frame and connecting-webs of lead protected as to their surfaces by a substance refractory at the temperature of melting lead and unattacked by sulfur at that temperature, and carrying between their interstices a spongy body of sulfid of lead, which metallically alloys with said frame and webs substantially as described.

4. A plate for secondary or storage batteries, composed of an external frame and connecting-webs of lead, protected by a substance refractory and unattacked by sulfur at the temperature of melting lead, and consisting of a composition of calcium fluorid 4.9 per cent., feldspar 45.6 per cent., sodium silicate 25.3 per cent., silicon dioxid 4.9 per cent. and barium 19.3 per cent., substantially as described.

In testimony whereof I have signed my name to this specification in the presence of two subscribing witnesses.

AUGUSTUS JOHN MARQUAND.

Witnesses:
RICHARD A. HOFFMANN,
CHARLES H. CARTER.